United States Patent
Rich et al.

(10) Patent No.: US 7,735,259 B2
(45) Date of Patent: Jun. 15, 2010

(54) ADJUSTABLE PLANT STAKE ASSEMBLY WITH IMPROVED GROUND ANCHORS AND KIT THEREFOR

(75) Inventors: Christopher T. Rich, Leola, PA (US); Curt Rymer, Bend, OR (US); Peter Byar, Willingboro, NJ (US)

(73) Assignee: Woodstream Corporation, Lititz, PA (US)

( * ) Notice: Subject to any disclaimer, the term of this patent is extended or adjusted under 35 U.S.C. 154(b) by 61 days.

(21) Appl. No.: 11/896,202

(22) Filed: Aug. 30, 2007

(65) Prior Publication Data
US 2009/0056212 A1    Mar. 5, 2009

(51) Int. Cl.
*A01G 17/08*    (2006.01)
*A01G 9/12*    (2006.01)

(52) U.S. Cl. .................. 47/47; 47/44; 47/46
(58) Field of Classification Search .......... 47/44, 47/45, 47, 48.5; 482/35, 39
See application file for complete search history.

(56) References Cited

U.S. PATENT DOCUMENTS

| | | | | |
|---|---|---|---|---|
| 1,673,117 A | * | 6/1928 | Kestenman | 24/71 J |
| 3,471,968 A | * | 10/1969 | Letz | 47/47 |
| 4,005,548 A | * | 2/1977 | Nahon | 47/45 |
| 4,480,403 A | * | 11/1984 | Williams | 47/42 |
| 4,655,000 A | | 4/1987 | Swick et al. | |
| D292,475 S | * | 10/1987 | Kitchen | D8/1 |
| 5,253,768 A | | 10/1993 | Traversa et al. | |
| 5,473,796 A | | 12/1995 | Fusillo | |
| 5,487,236 A | * | 1/1996 | Moon | 47/48.5 |
| 5,618,000 A | * | 4/1997 | Lantzy et al. | 239/276 |
| 5,711,107 A | * | 1/1998 | Louisiana | 47/45 |
| 5,881,495 A | * | 3/1999 | Clark | 47/48.5 |
| 5,921,443 A | * | 7/1999 | McMillan | 222/174 |
| 6,772,558 B2 | * | 8/2004 | Mancini | 47/42 |
| 7,017,299 B1 | * | 3/2006 | Speed et al. | 47/44 |
| 7,188,448 B2 | * | 3/2007 | Sedlacek | 47/47 |
| 2005/0130806 A1 | * | 6/2005 | Lopez | 482/38 |

FOREIGN PATENT DOCUMENTS

| | | |
|---|---|---|
| JP | 406335326 A | 12/1994 |
| JP | 02001299107 A | 10/2001 |

* cited by examiner

*Primary Examiner*—Son T Nguyen
*Assistant Examiner*—Marisa Conlon
(74) *Attorney, Agent, or Firm*—Jacobson Holman PLLC

(57) ABSTRACT

An adjustable plant stake assembly having cross braces, stake anchors and couplers is provided that can be used with conventional plant stakes. The cross braces extend between two adjacent plant stakes and are adjustable in length to adjust the spacing between the stakes. The stake anchors support the stakes and include a step portion that enables the anchor to be driven into the ground by stepping on the step. As the plant grows in height, each plant stake can be lengthened by connecting an additional plant stake to the top of the existing stake using one of the couplers. A kit including the plant stakes, cross braces, stake anchors and couplers is also included.

22 Claims, 7 Drawing Sheets

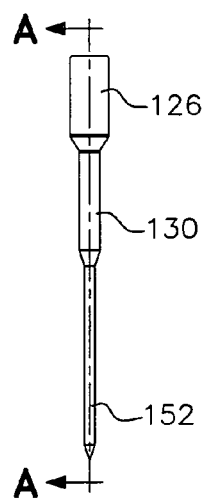
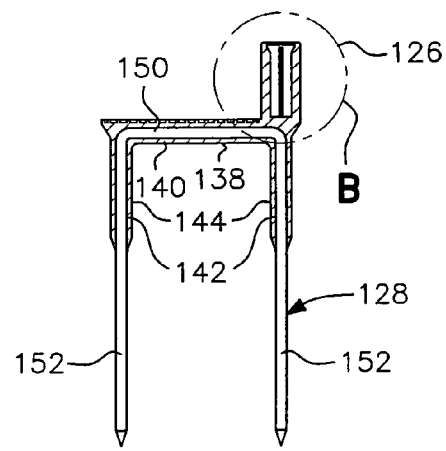
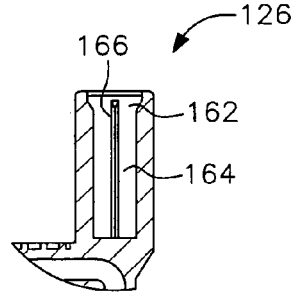
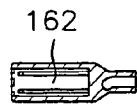
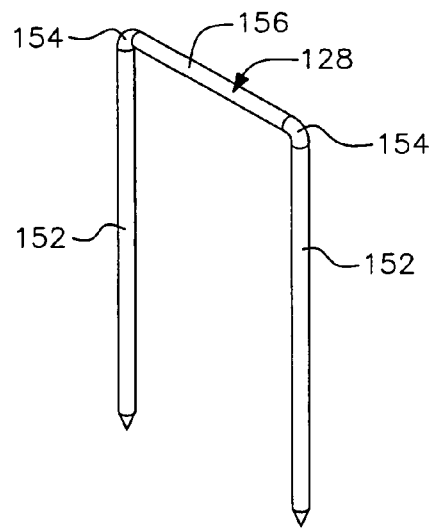

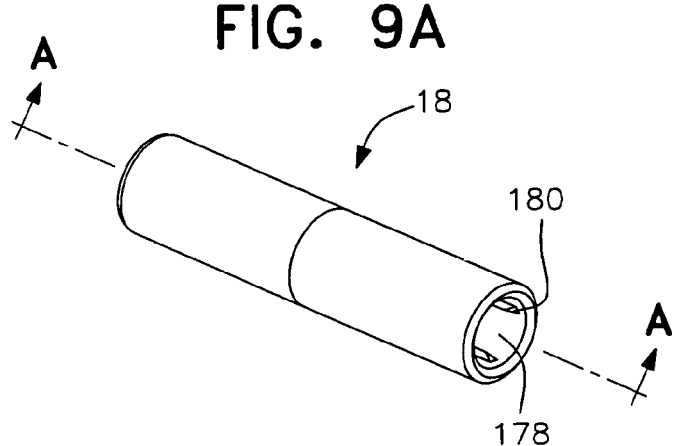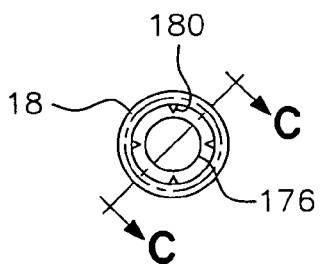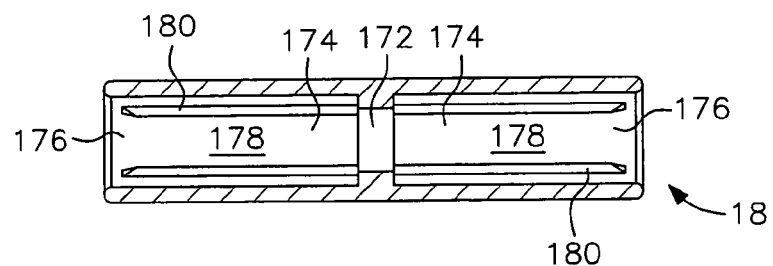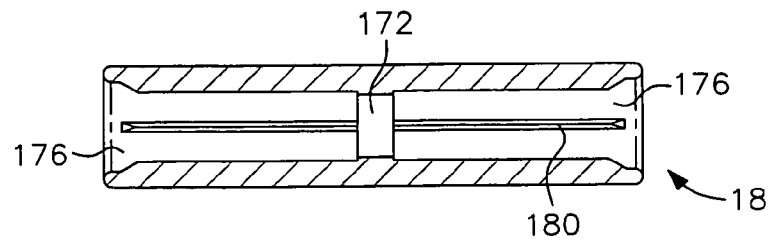

ADJUSTABLE PLANT STAKE ASSEMBLY WITH IMPROVED GROUND ANCHORS AND KIT THEREFOR

BACKGROUND OF THE INVENTION

1. Field of the Invention

The present invention is related to the field of horticulture and, more particularly, to an adjustable framework for supporting growing plants, such as tomato, pepper and other plants whose stalks or branches have a tendency to bend or break due to the weight of the vegetable, fruit or flower growing thereon.

2. Description of the Related Art

Many plants benefit from the availability of a vertical support framework sized to the plant that can protect the plant from shear stress that might otherwise break the plant's stalk or branches. This framework can be as simple as a vertical pole to which the plant is tied, or can be much more complex, with cross bars and upright ribs that form a latticework or wire cage to support the plant. Such framework is particularly useful for tomato plants, pepper plants and similar plants with heavy vegetables, fruit or flowers growing thereon.

Preassembled wire cages for plant support are awkward to use and unwieldy to store. Typically, they must be placed around the plant at an early stage in its growth as they are difficult to place on the plant after it has reached a larger size. However, while the plant is small, the wire cages dwarf the plant, creating an unsightly appearance. Later, the plant may outgrow the cage, necessitating its removal and replacement with a larger cage which, again, can be difficult to place on the plant.

A plant kit assembly directed to solving the problems with wire cages while providing support to plants is shown in U.S. Pat. No. 7,188,448 ("the '448 patent"), which is owned by the assignee of the present application, Woodstream Corporation. The disclosure of the '448 patent is expressly incorporated herein by reference as if fully set forth.

In the '448 patent, a removable clip device having a beam portion with C-shaped clamps on each end is used to secure two adjacent plant stakes in a spaced relationship that is determined by the length of the beam. The clip devices can be easily installed and removed, allowing the diameter of the framework surrounding the plant to be adjusted by adding additional stakes and/or by changing the relative angles between the stakes. The spacing between the stakes cannot be adjusted, however, as the beam portion has a fixed length. This can create a problem when the plant structure or other factors make it difficult to space the stakes in accordance with the beam length.

Another problem that is often encountered is difficulty in installing the plant stakes that serve to anchor the support framework. In most cases a hammer or mallet is required to pound the stakes into the ground. When the plant is large with well-developed branches that extend outwardly, it can be difficult to swing the hammer freely enough to apply the force necessary to drive the stakes without risking damage to the plant. Also, tall stakes can be difficult to drive into the ground as it is often difficult to achieve the necessary downward force on the top of the stake to obtain a substantially vertical driving orientation, e.g., the stake flexes from the impact rather than penetrating deeper into the ground.

SUMMARY OF THE INVENTION

In view of the foregoing, one object of the present invention is to overcome the difficulties of supporting plants as they grow by providing a kit having components for creating an adjustable framework that is easy to install and aesthetically pleasing.

Another object of the present invention is to provide a plant stake assembly that can be easily adjusted to fit the increasing size of the plant while retaining the existing stake assembly.

A further object of the present invention is to provide a kit for a plant stake assembly having an anchoring component that can be secured in the ground more easily and without the use of tools.

Yet another object of the present invention is to provide a kit and a corresponding plant stake assembly having cross braces that can be adjusted in length to change the "diameter" of the assembly around the plant as well as the lateral spacing of the stakes.

A still further object of the present invention is to provide adjustable length cross braces that can be mounted at different angles through the use of pivoting clamps on the cross braces.

Another object of the present invention is to provide an adjustable plant stake assembly with improved ground anchors that is not complex in structure and which can be manufactured at low cost but yet effectively offers a wide range of plant support framework configurations.

In accordance with these and other objects, the present invention is directed to a plant stake assembly having plant stakes, cross braces, stake anchors and couplers and a kit containing such components. The plant stakes are preferably conventional plant stakes that are generally about three feet in length. The cross braces, which extend between two adjacent plant stakes, are adjustable in length so as to support different spacing between the stakes. The stake anchors into which a plant stake lower end is inserted for vertical support include a step portion that enables the anchor to be driven into the ground by the weight of the installer stepping on the step portion. As the plant grows in height, each plant stake can be vertically lengthened by connecting an additional plant stake to the top of the existing stake using one of the couplers.

These together with other objects and advantages which will become subsequently apparent reside in the details of construction and operation as more fully hereinafter described and claimed, reference being had to the accompanying drawings forming a part hereof, wherein like numerals refer to like parts throughout. The drawings are intended to illustrate the invention, but are not necessarily to scale.

BRIEF DESCRIPTION OF THE DRAWINGS

FIG. 7E is an end view of the stake anchor of FIG. 7A.

FIG. 7F is a cross-sectional view taken along line A-A of FIG. 7E.

FIG. 7G is an enlarged view of the area "B" of FIG. 7F.

FIG. 7H is a partial cross-sectional view taken along line E-E of FIG. 7C.

FIG. 8 is a perspective view of a metallic insert for the stake anchor of FIG. 7A.

FIG. 9A is a perspective view of one of the couplers of FIG. 1.

FIG. 9B is an end view of the coupler of FIG. 9A.

FIG. 9C is a cross-sectional view taken along line C-C of FIG. 9B.

FIG. 9D is a cross-sectional view taken along line A-A of FIG. 9A.

DETAILED DESCRIPTION OF THE PREFERRED EMBODIMENTS

Figure 1:
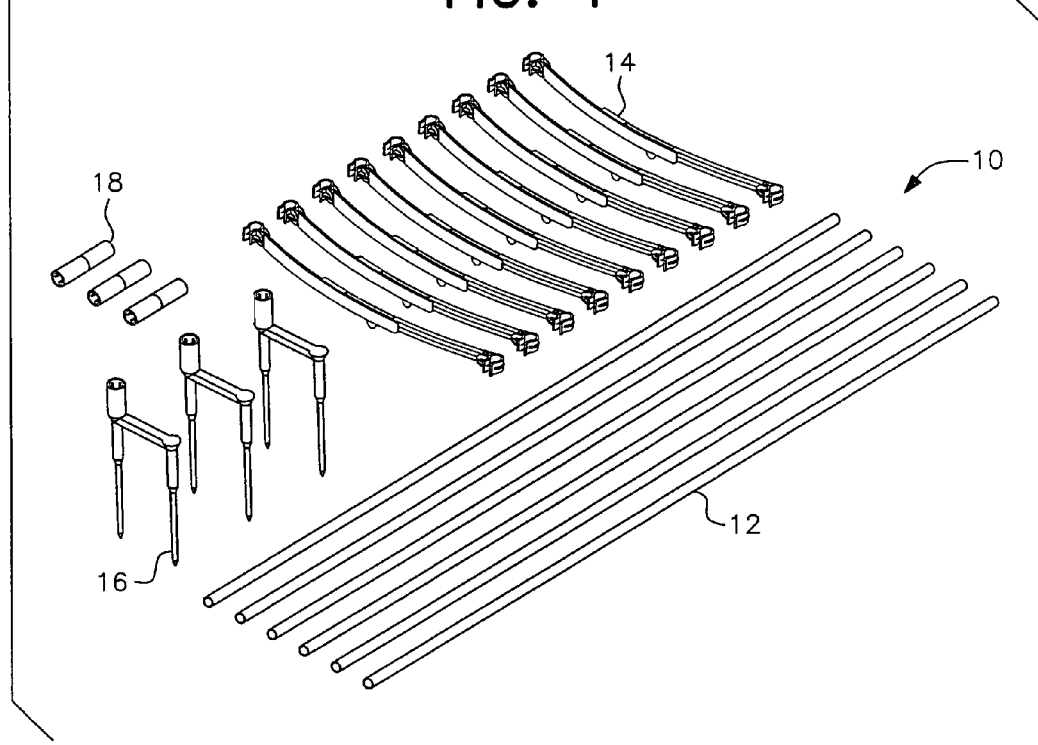
FIG. 1 is a schematic drawing of the components of a preferred embodiment of a kit for an adjustable plant stake assembly in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
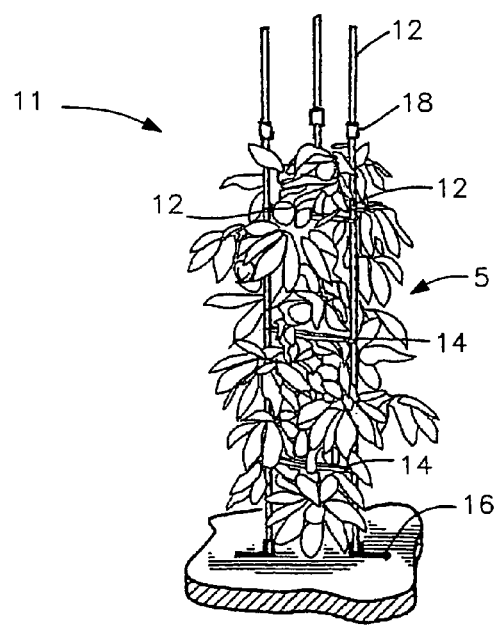
FIG. 2 is a schematic drawing of an adjustable plant stake assembly according to the present invention made with the components of the kit of FIG. 1 assembled to support a plant.
Figure 3:
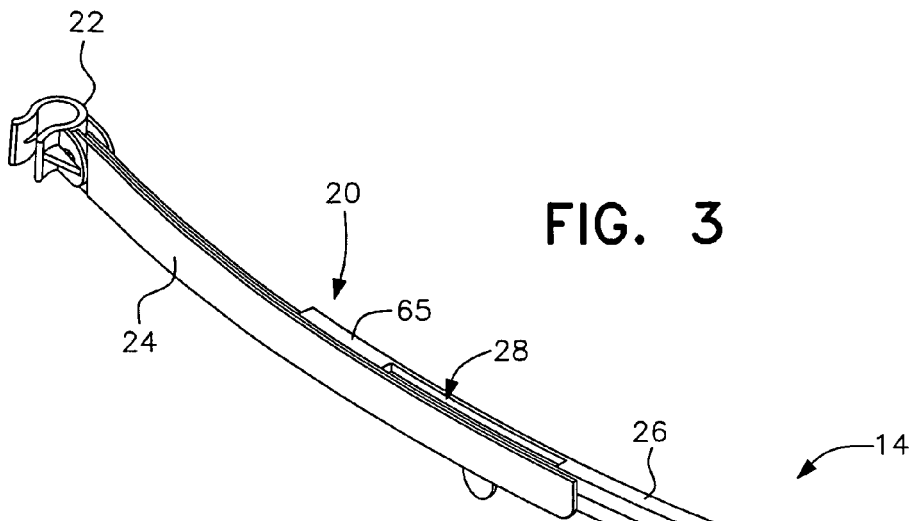
FIG. 3 is a perspective view of one of the adjustable cross braces of FIG. 1 with bracket and end clips.

As set forth in FIGS. 1 and 2, respectively, the present invention is directed to a kit generally designated by the reference numeral 10 having components for making an adjustable plant stake assembly generally designated by the reference numeral 11. The kit 10 includes a plurality of plant stakes 12, a plurality of adjustable length cross braces 14, a plurality of stake anchors 16 and a plurality of couplers 18. These components of the kit 10, when assembled as desired, form one or more adjustable stake assemblies 11 which serve to support a plant 5 by providing a framework that surrounds the plant.

As shown in greater detail in FIGS. 3, 4A-4C, 5A-5I, 6A-6C, and 7A-7H, each cross brace 14 has an adjustable length bracket, generally designated by the reference numeral 20, provided with end clips 22 that secure the cross brace 14 between two adjacent plant stakes 12. The adjustability in the length of the bracket 20 is provided by the bracket having two elongated members configured as an outer bracket member 24 and an inner bracket member 26. The outer and inner bracket members 24, 26 are slidably arranged in a juxtaposed relationship so as to have a variable length overlapping region, generally designated by the reference numeral 28, along a length of the bracket. The length of the overlapping region 28 is inversely related to the overall length of the bracket 20 such that as the overlapping region length increases, the overall length of the bracket decreases.

Figure 4A:
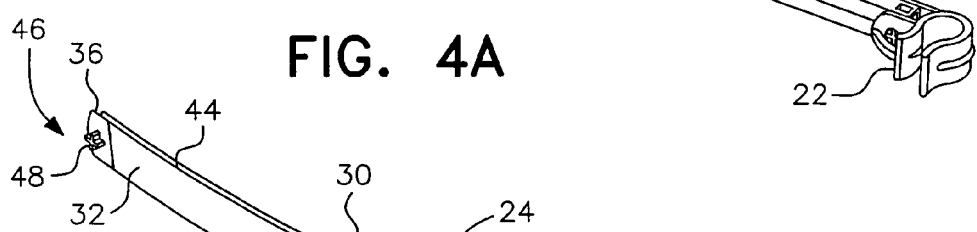
FIG. 4A is a perspective view of the inner bracket member of the bracket of FIG. 3.
Figure 4C:
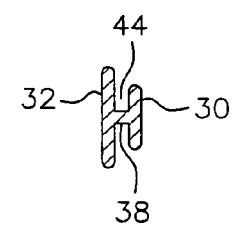
FIG. 4C is a cross-sectional view taken along line A-A of FIG. 4B.
Figure 4B:
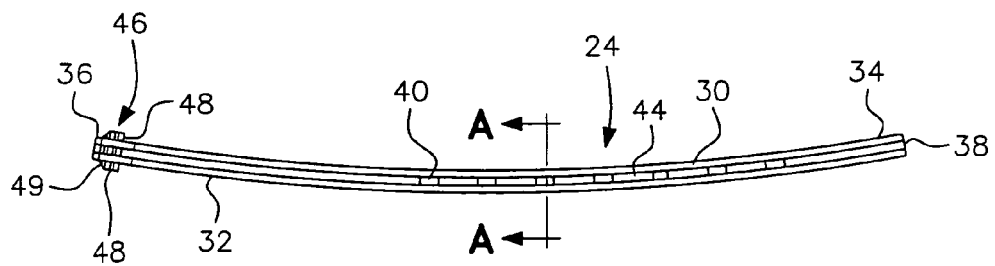
FIG. 4B is a top view of the inner bracket member of FIG. 4A.
Figure 5A:
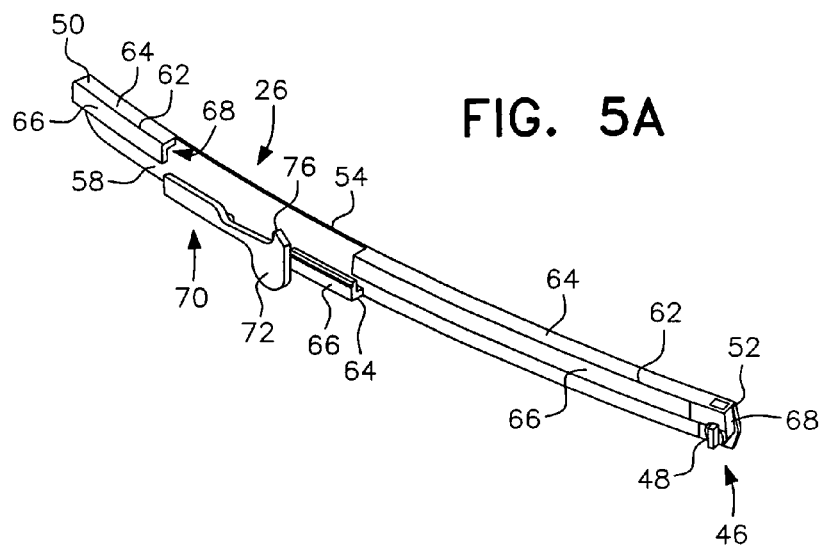
FIG. 5A is a perspective view of the outer bracket member of the bracket of FIG. 3.
Figure 5B:
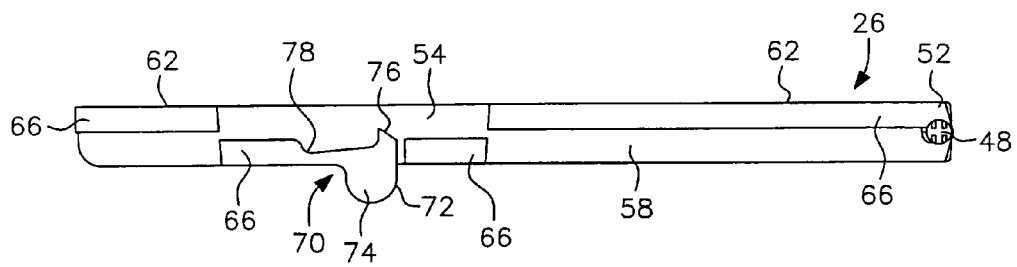
FIG. 5B is a side view of the outer bracket member of FIG. 5A.
Figure 5C:
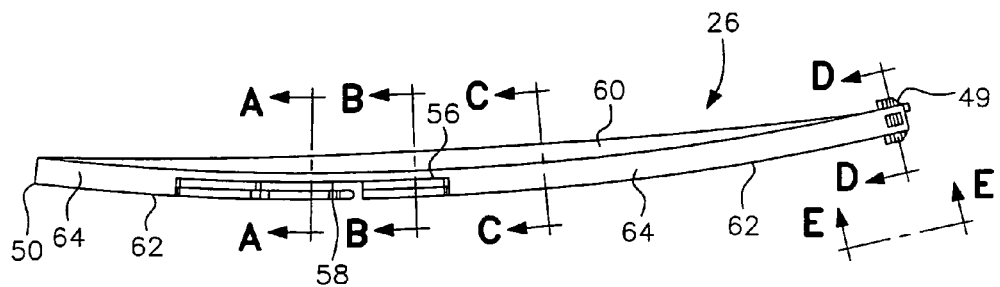
FIG. 5C is a top view of the outer bracket member of FIG. 5B.
Figure 5D:
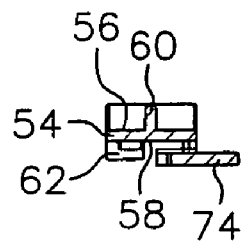
FIG. 5D is a cross-sectional view taken along line A-A of FIG. 5A.
Figure 5E:
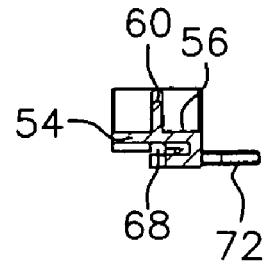
FIG. 5E is a cross-sectional view taken along line B-B of FIG. 5C.
Figure 5F:
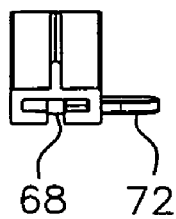
FIG. 5F is a cross-sectional view taken along line C-C of FIG. 5C.
Figure 5G:
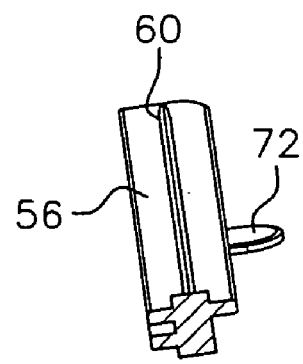
FIG. 5G is a cross-sectional view taken along line D-D of FIG. 5C.
Figure 5H:
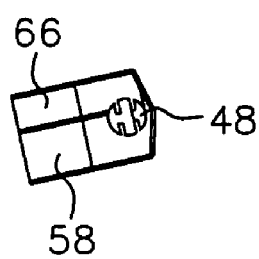
FIG. 5H is an enlarged side view taken along line E-E of FIG. 5C.
Figure 5I:
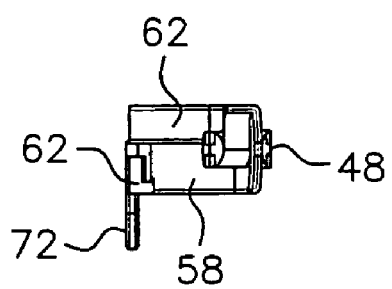
FIG. 5I is an end view of the outer bracket of FIG. 5B.

As shown in FIGS. 4A-4C, the outer bracket member 24 includes two elongated flat portions 30, 32 extending in a generally parallel relationship between an inner end 34 and an outer end 36. The inner flat portion 30, which is slightly shorter in height than the outer flat portion 32, is joined with the outer flat portion 32 near their height center by a bridge 38. The bridge 38 thus divides the inner flat portion 30 and the outer flat portion 32 such that the exposed sides of the bridge in conjunction with the inner and outer flat portions 30, 32 define grooves 44 on each edge of the outer bracket member 24. The bridge 38 has a plurality of apertures 40 therethrough that extend transversely to the length of the inner and outer flat portions 30, 32 and are spaced from one another between the inner and outer ends 34, 36.

The outer end 36 includes an end clip mounting structure, generally designated by the reference numeral 46, with a projecting portion 48 on each side of the outer bracket member. An end clip 22 is pivotally secured with a snap fit to the projecting portions 48. The outer bracket member 24 is preferably curved along its longitudinal length with the inner flat portion 30 being concave and the outer flat portion 32 being convex, as best seen in FIG. 4B. This curved shape allows the cross brace 14 to define a somewhat rounded enclosure which is aesthetically pleasing and better emulates the round nature of a tomato or similar cage.

Turning to FIGS. 5A-5I, the inner bracket member 26 is also preferably curved longitudinally between its inner and outer ends 50, 52, respectively, to cooperate in slidable engagement with the curved outer bracket member 24. The inner bracket member 26 includes an elongated flat portion 54 having inner and outer surfaces 56, 58 (with respect to the plant) that are defined by the curve of the bracket member, with the inner surface 56 being concave and the outer surface 58 being convex. The inner surface 56 has a longitudinally extending central gussett 60 that approaches but preferably does not reach the inner and outer ends 50, 52 for reinforcing the bracket member 26. The outer surface 58 includes a plurality of edge guide elements 62, each having a first portion 64 that extends laterally away from the outer surface 58 and a second portion 66 that is orthogonal to the first portion so as to be generally parallel with the outer surface 58. Together, the first and second portions 64, 66 define a series of longitudinal channels, generally designated by the reference numeral 68, extending along the upper and lower edges of the outer surface 58.

The inner bracket member 26 further includes a pivotally movable member, generally designated by the reference numeral 70, with a head 72. The head 72 includes a gripping portion 74 and a tip 76 that is sized to be received in a selected one of the apertures 40. The pivoting action is preferably provided by a living hinge 78, although other mechanisms allowing articulation of member 70 could also be used as would be known by persons of ordinary skill in the art. The head 72 pivots away from the bracket to allow sliding movement of the inner and outer bracket members, and into the bracket to lock the inner and outer bracket members 24, 26 in a fixed relationship longitudinally.

More particularly, the outer and inner bracket members 24, 26 are engaged with one another by inserting the inner flat portion 30 of the outer bracket member 24 into the outermost channel 68 of the outer bracket member and sliding the outer and inner bracket members into an overlapping relationship at the ends 34, 50. As the inner flat portion 30 enters the channel, the second portions 66 of the edge guide elements 62 are received in the grooves 44 to form a tongue-and-groove type connection so that the outer surface 65 of the first edge portion 64 is flush with the edge of the outer flat portion 32.

To increase the overlapping region 28, the head 72 of the movable member 70 is grasped by the gripping portion 74 and pivoted until the tip 76 is clear of the apertures 40, allowing the outer and inner bracket members to continue to slide relative to one another. Once a desired bracket length is achieved, the head 72 of the movable member 70 is pivoted back toward the bracket to bring the tip 76 into engagement with an aligned aperture 40. With the tip 76 projecting into or hooked in the aperture 40, the inner and outer bracket members are locked to prevent sliding movement relative to one another.

Figure 6A:
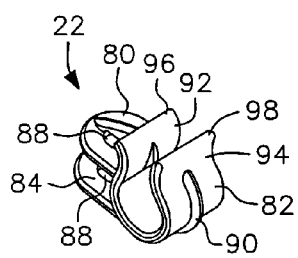
FIG. 6A is a perspective view of the end clip of the cross brace of FIG. 3.
Figure 6B:
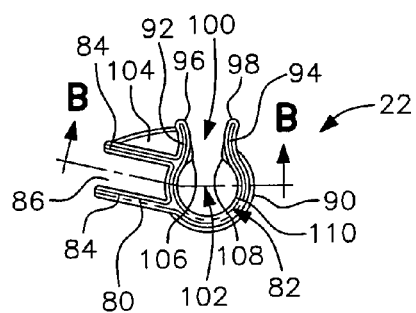
FIG. 6B is a top plan view of the end clip of FIG. 6A.
Figure 6C:
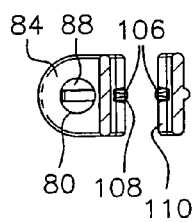
FIG. 6C is a cross-sectional view taken along line B-B of FIG. 6B.
Figure 7A:
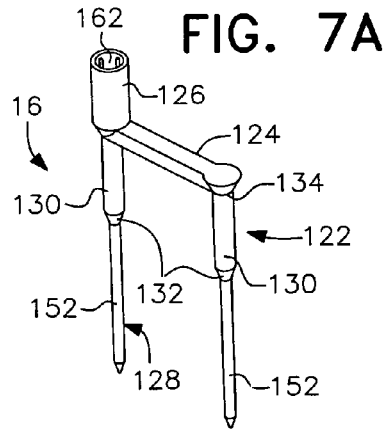
FIG. 7A is a perspective view of one of the stake anchors of FIG. 1.
Figure 7B:
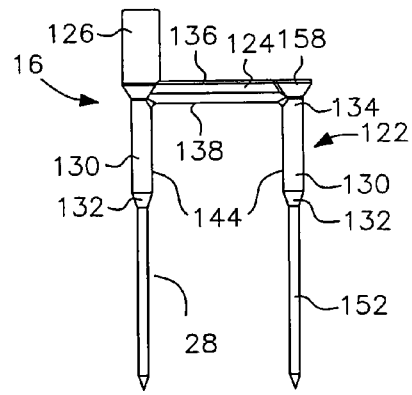
FIG. 7B is a side view of the stake anchor of FIG. 7A.
Figure 7C:
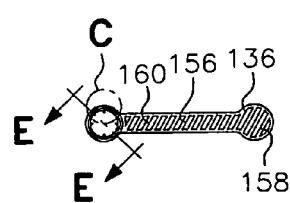
FIG. 7C is a top view of the stake anchor of FIG. 7A.
Figure 7D:
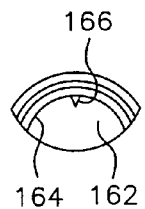
FIG. 7D is an enlarged view of the area "C" of FIG. 7C.

Like the outer bracket member 24, the outer end 52 of the inner bracket member 26 includes an end clip mounting structure 46 with a cylindrical projection 48 on each side of the inner bracket member by which an end clip 22 can be pivotally secured to the inner bracket member 26. Each end clip 22 includes a bracket mount portion 80 and a clamp portion 82, as shown in FIGS. 6A-6C.

The bracket mount portion 80 of the end clip 22 includes two flanges 84 spaced from and generally parallel with one another so as to define a space 86 therebetween. Each of the flanges 84 has a hole 88 therethrough that aligns with a corresponding one of the projections 48 when the outer ends 36, 52 of the bracket members are inserted into the space 86. Once aligned, the end clips 22 are snapped into engagement with the bracket members by engaging the projections 48 with the holes 88. The outer edge 49 of the projections 48 is beveled to facilitate movement of the bracket mount flanges 84 thereover for seating the projection 48 in its respective hole 88. Once engaged, the end clips 22 can pivot side to side around the projecting portions 48 while remaining in longitudinal alignment with the outer ends 36, 52. The range of pivotal motion is preferably about 20-45 degrees, and more preferably about 30 degrees, although this range could be increased by lengthening the flanges 84. The preferred range is generally sufficient, however, to provide the desired flexibility in positioning of the cross brace 14 to allow for sloped orientations from one stake to the adjoining stake.

The clamp portion 82 of the end clip 22 is generally C-shaped in configuration with a reinforcing collar 90 extending around a portion of the outer circumference of each clamp portion 82. Because the end clips are preferably molded of plastic material, the clamp portions 82 are formed of a stiff yet resilient material. As is illustrated, each of these clamp portions includes a stationary jaw section 92 and a flexing jaw section 94, with the stationary jaw section 92 being joined with the flanges 84 of the bracket mount portion 80. The stationary and flexing jaw sections 92, 94 have free end portions 96 and 98, respectively, that first converge toward one another and then diverge from one another to form an entryway, generally designated by the reference numeral 100, to a bay 102. An end gussett 104 interconnects the free end portion 96 of the stationary jaw section 92 with the flange that is nearest the entryway 100. The bay 102 is sized to engage a portion of the plant stakes. This engagement allows the user to "snap-fit" each clamp portion 82 onto a plant stake so that the size of the entryway 100 should be smaller than the cross-wise dimension of the stake 12 and the dimension of the bay 102 slightly larger than the cross-wise dimension of the stake 12.

With reference again to FIG. 6B, it may be seen that the diameter of bay 102 is chosen to be slightly larger than the diameter of a cylindrical plant stake so that the clamp portions 82 may resiliently clamp onto a respective stake. Moreover, entryway 100 is slightly smaller than the diameter of stake so that the clamp devices may snap fit over a stake during assembly. To further facilitate engagement of the clamp portions 82 with a stake, each of the clamp portions is provided with a detent structure 106. Each of these detent structures 106 is formed by a small triangularly shaped ear that has an inner edge 108 formed along the same radius of curvature as sidewall 110.

The adjustable-length bracket 20 according to the present invention provides a very adaptable cross brace for connecting adjacent plant stakes with varied spacing. The pivotally mounted end clips allow the stakes to be angled with respect to each other, yielding a tapered plant support configuration. This articulating capability also allows the cross braces 14 to be mounted at angles to the horizontal while the stakes remain vertical. This articulation can be helpful when the plant is growing on a slope or other variable surface in which the plant stake assembly needs to follow an uneven topography.

While the connecting mechanism securing the inner and outer bracket members discussed herein is a tongue-and-groove type connection, various telescoping means could be employed to provide the adjustable length feature as in the case of a curtain rod or an extension pole. As a further alternative, modular lengths could be added and subtracted to increase and decrease the length, or a hinged member could be provided that would pull or push the stakes closer together or further apart. All such alternatives are intended to be included within the scope of the present invention.

As depicted in FIGS. 7A-7H, the present invention further includes a stake anchor 16 having a ground portion, generally designated by the reference numeral 122, that is driven into the ground to hold the anchor, a step 124 used to apply the force necessary to drive the stake anchor, and a plant stake support 126 into which the bottom end of a plant stake is inserted and held in a substantially vertical orientation when the ground portion is in the ground. The ground portion, step and plant stake support can be made integrally of a molded plastic material such as by injection molding. For increased strength and durability, however, a preferred embodiment includes generally U-shaped metal insert generally designated by the reference numeral 128, as shown in FIG. 8, that reinforces the step 124 and both reinforces and lengthens the ground portion 122, as will be discussed more fully hereinafter.

The ground portion 122 includes two spikes 130 spaced from one another and generally parallel in longitudinal length. The spikes 130 have pointed tips 132 at one end and base portions 134 at an opposite end that are joined to one another by the step 124. The step 124 is generally perpendicular to the longitudinal length of the spikes 130 and preferably has a generally flat upper surface 136 that is stepped on to drive the ground portion into the ground. According to a preferred embodiment, the lower surface 138 of the step 124 has a step channel 140 cut therein that communicates with corresponding spike channels 142 in the inwardly facing surfaces 144 of each spike 130.

The metal insert 128 has an upper bar 150 with two downwardly depending legs 152 that are longer than the spikes 130. The insert 128 is frictionally fitted within the step 124 and ground portion 122 by aligning the corners 154 of the bar 150 with the spike channels 142 and then sliding the bar 150 toward the lower surface 138 of the step 124 to bring the legs 152 into engagement with the spike channels 142. The metal insert 128 is fully inserted when the bar 150 is received within the step channel 140. In this position, the legs 152 extend well beyond the spikes 130 and serve as the primary means of securing the stake anchor 16.

The plant stake support 126 is in generally linear alignment with one of the spikes 130 so that pushing downward on the plant stake 12 secured in the plant stake support 126 will further drive the stake anchor 16 into the ground. The upper surface 156 of the step overlying the other spike is preferably provided with an expanded area 158 that allows the user to apply greater force immediately over the spike. In addition, the upper surface 156 of the step is preferably provided with a roughened texture 160 to give the user a firm foothold when stepping on the anchor 16.

The plant stake support 126 has a socket 162 for receiving an end of the plant stake 12. The inner surface 164 of the socket 162 preferably includes longitudinally extending ridges 166 to allow the socket 162 to more securely hold the plant stake with a friction fit. The plant stake support is preferably injection molded as a single unit with the step and spikes, including the channels and step surface texture features. The anchors must be robust enough to avoid corrosion from outdoor and underground exposure. According to one preferred embodiment, the anchor includes a metal insert of stainless steel encased with a resin such as high density polyethylene (HDPE) or polypropylene (PP), although other resins could also be used. Another preferred embodiment that is lower in cost is to make the metal insert of carbon steel that is powder coated prior to insert molding the plastic. Aluminum could also be used as a robust solution, but would be more costly than the powder-coated carbon steel.

While the anchor is primarily disclosed as having a removable metal insert, alternatively, the plastic components 122, 124, 126 can be molded onto the metal insert 128 to form a solid, one-piece unit.

Finally, the plant stake kit 10 includes one or more couplers 18 that allow the overall length of the plant stakes to be increased. This adjustable length allows the consumer to create his/her desired stake assembly 11 at a short height when the plant is short, avoiding the ungainly sight of a plant framework that towers over the plant, and to then add one or more stakes later to increase the height of the system after the plant has grown.

As shown in FIGS. 9A-9D, the coupler 18 is a generally tubular element with a tranverse member 172 dividing the bore 174 into two sockets 176 that are sized to receive the ends of the plant stakes. Like the plant stake support socket 162, the inner surface 178 of each coupler socket 176 preferably includes longitudinally extending ridges 180 to allow the socket to more securely hold the plant stake with a friction fit.

To increase the height of an existing plant support assembly, the socket 176 on one side of the coupler 18 is pressed down onto the upper end of the existing installed plant stake. A second stake is then inserted into the socket 176 on the other side of the coupler 18, as representatively shown in FIG. 2.

As can be seen, with the adjustable-length cross braces 14, stake anchors 16 that can be driven without tools, and couplers 18 that support an increase in plant stake height, the plant stake kit 10 according to the present invention provides a system that is easy to construct and readily adapted to meet the needs of nearly any plant support application.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An adjustable plant stake assembly comprising:
   a plurality of plant stakes, each of said plant stakes being adapted to be erected in a substantially upright manner relative to a support surface, and arranged in spaced-apart relation to one another;
   a cross brace having a bracket with an end clip on each end that secures the cross brace to two adjacent plant stakes, said end clips being pivotally mounted on an axis that is transverse to a longitudinal length of said bracket to allow said cross brace to be secured to said plant stakes when not perpendicular thereto through pivoting of said end clips to a position that is out of linear alignment with said bracket, said bracket having an outer bracket member and an inner bracket member slidably arranged adjacent one another to adjust an overall length of said cross brace, one of said outer and said inner bracket members having two side walls separated from one another by a spacer to form upper and lower grooves, the other of said outer and said inner bracket members having upper and lower flanges that are received in said upper and lower grooves, respectively, said upper and lower flanges sliding longitudinally in said respective grooves when said cross brace overall length is being adjusted; and
   a stake anchor having a ground portion that is driven into the ground to hold the anchor, a step used to apply the force necessary to drive the stake anchor, and a plant stake support into which an end of a plant stake is inserted and held in a substantially vertical orientation when the ground portion is in the ground.

2. The adjustable plant stake assembly as set forth in claim 1, wherein a length of said overlapping region is inversely related to an overall length of said bracket such that as the overlapping region length increases, the overall length of the bracket decreases.

3. The adjustable plant stake assembly as set forth in claim 1, wherein said outer bracket member includes a plurality of apertures spaced from one another along said bracket length, said inner bracket member having a movable member with a tip that is received in a selected one of said apertures to secure the bracket at a desired length.

4. The adjustable plant stake assembly as set forth in claim 1, wherein the ground portion includes two spikes spaced from one another and generally parallel in longitudinal length, said spikes having pointed tips at one end and base portions at an opposite end, said step joining said base portions and being generally perpendicular to said longitudinal length.

5. The adjustable plant stake assembly as set forth in claim 4, wherein the plant stake support is in generally linear alignment with one of said spikes.

6. The adjustable plant stake assembly as set forth in claim 5, further comprising a reinforcing insert secured to the ground portion and the step and extending outwardly from said spikes in alignment therewith.

7. The adjustable plant stake assembly as set forth in claim 6, wherein said reinforcing insert fits within channels formed in the spikes and the step.

8. The adjustable plant stake assembly as set forth in claim 5, wherein said plant stake support has a socket configured to receive a plant stake with a friction fit.

9. The adjustable plant stake assembly as set forth in claim 1, wherein the step includes a roughened upper surface to provide a user with a secure foothold when forcing the anchor into the ground.

10. The adjustable plant stake assembly as set forth in claim 1, wherein said each end clip includes a pair of flanges defining a space therebetween, said bracket ends fitting within said space and engaging with said flanges.

11. The adjustable plant stake assembly as set forth in claim 10, wherein said flanges each have a hole therein, said bracket ends having a projection that is secured within said holes with a snap fit.

12. The adjustable plant stake assembly as set forth in claim 1, further comprising a coupler having a tubular configuration with sockets at each end, said coupler joining two plant stakes in linear alignment by insertion of said stakes into said sockets.

13. The adjustable plant stake assembly as set forth in claim 12, wherein said sockets have ridges on an inner surface thereof to hold said plant stakes with a friction fit.

14. A kit adapted for use in supporting a plant relative to a support surface, comprising:
   a plurality of plant stakes, each of said plant stakes being adapted to be erected in a substantially upright manner relative to the support surface, and arranged in spaced-apart relation to one another;
   a plurality of cross braces, each of said cross braces having a bracket with an end clip on each end that secures the cross brace to two adjacent plant stakes, said bracket having an outer bracket member and an inner bracket member slidably arranged adjacent one another to adjust an overall length of said cross brace, one of said outer and said inner bracket members having two side walls that together form upper and lower channels, the other of said outer and said inner bracket members having an upper flange that is received in said upper channel and a lower flange that is received in said lower channel, said upper and lower flanges sliding longitudinally in said respective channels when said cross brace overall length is being adjusted; and
   a plurality of stake anchors, each of said stake anchors having a ground portion that is driven into the ground to hold the anchor, a step used to apply the force necessary to drive the stake anchor, and a plant stake support into which an end of one of said plant stakes is inserted and held in a substantially upright orientation when the ground portion is in the ground.

15. The kit as set forth in claim 14, further comprising a plurality of couplers, each of said couplers having a tubular configuration with sockets at each end for joining two of said plant stakes in linear alignment by insertion of the respective ends of said two stakes into said sockets.

16. The kit as set forth in claim 14, wherein the brackets are adjustable in length, each bracket including two elongated members slidably arranged adjacent one another so as to have a variable length overlapping region.

17. An adjustable plant stake assembly comprising: a plurality of plant stakes used in spaced relationship to support a growing plant; an adjustable-length cross brace for joining two plant stakes said cross brace including a bracket with an end clip on each end that secures the cross brace to two adjacent plant stakes, said bracket including an outer bracket member and an inner bracket member slidably arranged adjacent one another so as to have a variable length overlapping region, a length of said overlapping region being inversely related to an overall length of said cross brace, said outer bracket member having two generally parallel side walls spaced from one another by a center bar to form an upper groove and a lower groove that extend longitudinally along a length of said outer bracket member, said inner bracket member having first and second tongues formed on an outer side thereof that are received within said lower and upper grooves, respectively, and that slide within said grooves when the length of the cross brace is being adjusted.

18. The adjustable plant stake assembly as set forth in claim 17, wherein said each end clip includes a pair of flanges defining a space therebetween, said bracket ends fitting within said space and engaging with said flanges.

19. The adjustable plant stake assembly as set forth in claim 18, wherein said flanges each have a hole therein, said bracket ends having a projection that is secured within said holes with a snap fit.

20. The adjustable plant stake assembly as set forth in claim 17, wherein said center bar of said outer bracket member includes a plurality of apertures spaced from one another along said bracket length, and said inner bracket member includes a movable member with a tip that is received in a selected one of said apertures to secure the bracket at a desired length.

21. The adjustable plant stake assembly as set forth in claim 20, wherein said movable member is integrally formed with one of said tongues and is movable relative thereto by a living hinge.

22. The adjustable plant stake assembly as set forth in claim 17, wherein said end clips are pivotally mounted on the ends of said bracket.

* * * * *